(12) United States Patent
Qin et al.

(10) Patent No.: US 8,688,685 B2
(45) Date of Patent: Apr. 1, 2014

(54) ACCELERATED SEARCHING OF SUBSTRINGS

(75) Inventors: Bin Qin, Phoenix, AZ (US); Michael Davis, Scottsdale, AZ (US); David Lyons, Tempe, AZ (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/525,160

(22) Filed: Jun. 15, 2012

(65) Prior Publication Data

US 2013/0339339 A1    Dec. 19, 2013

(51) Int. Cl.
*G06F 7/00* (2006.01)
*G06F 17/30* (2006.01)

(52) U.S. Cl.
USPC ............... 707/713; 707/758; 707/769

(58) Field of Classification Search
None
See application file for complete search history.

(56) References Cited

U.S. PATENT DOCUMENTS

| | | | | |
|---|---|---|---|---|
| 6,047,283 | A * | 4/2000 | Braun | 1/1 |
| 6,553,370 | B1 * | 4/2003 | Andreev et al. | 1/1 |
| 8,321,440 | B2 * | 11/2012 | Beylin | 707/758 |
| 2003/0093415 | A1 | 5/2003 | Larson et al. | |
| 2003/0187858 | A1 * | 10/2003 | Kirk et al. | 707/100 |
| 2006/0059173 | A1 * | 3/2006 | Hirsch et al. | 707/100 |

FOREIGN PATENT DOCUMENTS

WO    WO-02/057883 A2    7/2002

OTHER PUBLICATIONS

Extended European Search Report dated Nov. 28, 2013, for corresponding European application No. 13002942.4.

* cited by examiner

*Primary Examiner* — Loan T Nguyen
(74) *Attorney, Agent, or Firm* — Mintz Levin Cohn Ferris Glovsky and Popeo, PC

(57) ABSTRACT

Accelerated sub-string searches on large data sets can be performed using filtering processes that can improve or optimize run time performance. A first filtering process can include partitioning a binary tree into sections to enable an exact search to replace a substring search for part of the binary tree and for part of the binary tree to be potentially excluded from substring searching. A second filtering process can include comparing count representations of entries in the binary tree and of a received input string to potentially further exclude entries from substring searching.

19 Claims, 2 Drawing Sheets

ACCELERATED SEARCHING OF SUBSTRINGS

TECHNICAL FIELD

The subject matter described herein relates to searching of substrings within a set of records in a database.

BACKGROUND

It can be necessary in a variety of database applications to perform substring searches on very large data sets, for example those having up to 100 million, 500 million, or even more separate records. Such large data sets can present a number of challenges in performance, memory usage, and the like, particularly in use cases in which the records are searched for one or more substrings.

SUMMARY

A substring search on a large database having many records can be improved using filtering processes applied to binary trees of a data set to be searched. A first filtering process can include partitioning a binary tree for a field into sections based on lengths of keys of entries in the binary tree and on ordering of the contents of the keys and can further include excluding at least some entries based on the partitioning. A second filtering process can include comparing a count representation of a received input string with entry count representations of entries in the binary tree and potentially further excluding entries of the binary tree from substring searching if their entry count representation indicate that they cannot contain the received input string.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
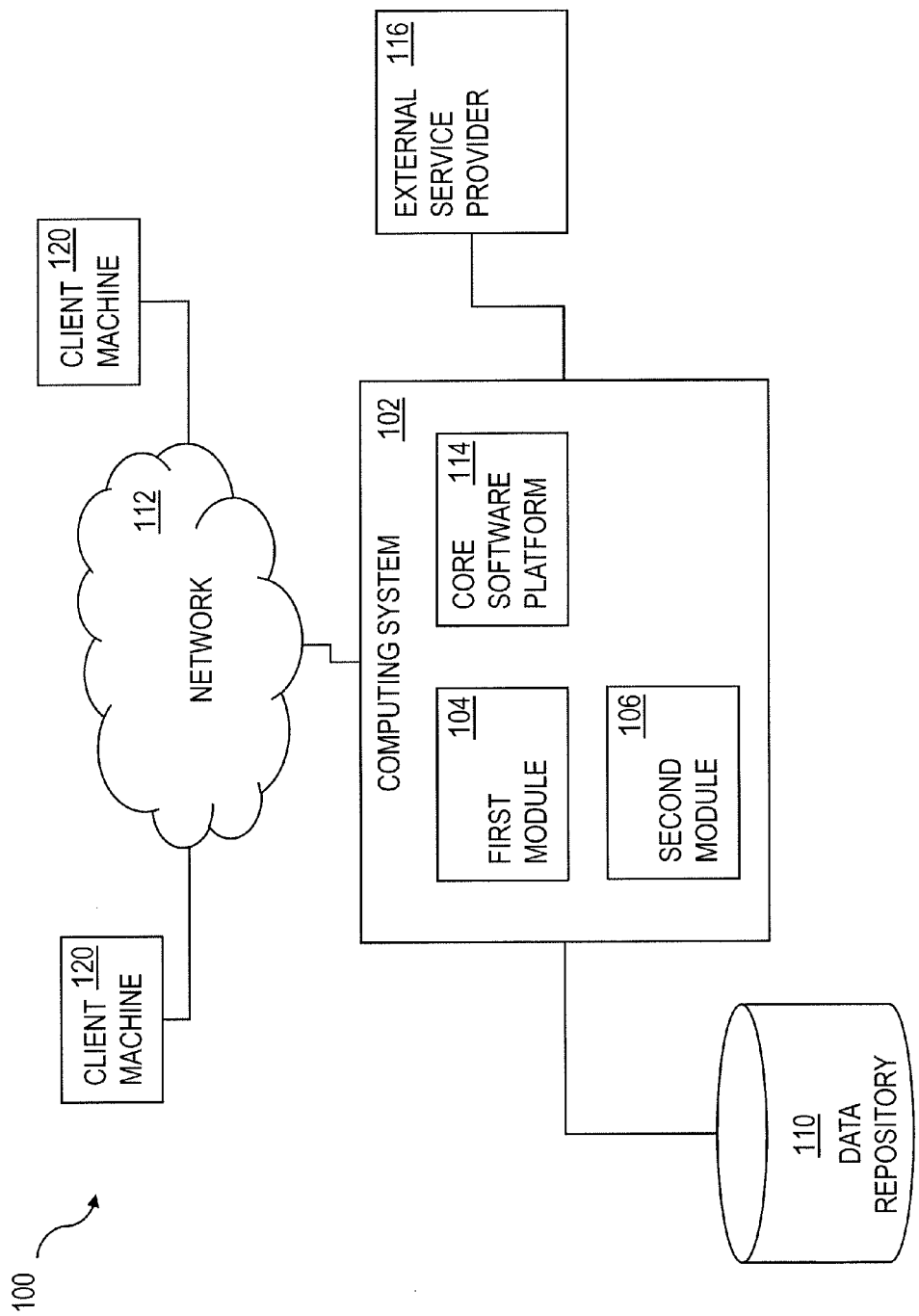
FIG. 1 is a process flow diagram illustrating aspects of a method having one or more features consistent with implementations of the current subject matter.

It can be desirable to be able to perform substring searches on very large data sets (for example, 100 million records, 500 million records, or even more) in a manner that is economical in terms of memory and processing resources. Consistent with one or more implementations of the current subject matter, a backend responsible for handling search requests can, among other possible operations, perform a search engine initialization and, using the initialized search engine, respond to received query requests. Such responding can optionally be performed synchronously, for example in real time or approximately real time. In this context, "approximately real time" is intended to include real time responses that may be slightly delayed due to communication delays, lags in input or output devices, network latency, or the like.

The search engine initialization can generally include operations relating to reading in the data set to be searched and building data structures to be used during the query request response operations. Such operations can advantageously achieve improved query performance at run time. A search engine used in responding to received query requests can be capable of supporting concurrent search requests. Responding to such received search requests can be accomplished by working on the data structures prepared during the search engine initialization and can thereby maximize the use of system resource to generate query results with improved performance.

A performance bottleneck for initialization can occur with reading of the records of the data set from the database. To improve initialization performance, in some implementations, the reading of the records of the data set and the construction of internal data structures can be performed in parallel. As a result, when the reading of the records of the data set is completed, the construction of the required internal data structures can also be at least almost completed.

In an implementation, a backend can leverage a programmed input/output (PIO) execution environment, for example to implement search logic using C++. The backend can include a database management system, which can optionally include a data set stored in an in-memory database (also referred to as a main memory database). Query results can also optionally be written to the in-memory database. Search requests can in some implementations be forwarded to the backend through an execution environment's TCP/IP interface.

Implementations of the current subject matter can improve overall performance of a database search approach by doing at least one of trading initialization performance for run time performance and trading memory usage for execution speed. In one example, a database management system can be capable of handling 500 million data set records with 1 TB memory. One or more features can be employed in providing improved performance consistent with this disclosure, including but not limited to preparation of the data set during initialization of the search engine, utilizing one or more high efficiency substring search algorithms (such as for example the Knuth-Morris-Pratt algorithm); minimizing or reducing the use of the one or more substring algorithms, make use of as many CPUs as possible; load balance substring searches to minimize the loss of CPU power; and maximize usage of system resources for example by performing input/output and searches in parallel. Improved performance can be achieved without compromising system reliability using one or more of the above-noted approaches in some combination. One or more design and implementation tradeoffs can be made within the scope of the current subject matter to save memory and improve reliability. In implementations in which memory usage is not a significant concern, further improvements in performance can also be achieved.

In an implementation of the current subject matter illustrated in the architecture diagram 100 shown in FIG. 1, a backend 102 can be responsible for handling search requests. A first module 104 and a second module 106 can be part of the backend 102, which can be implemented in a computing system. The computing system of the backend 102 can optionally include one or more physical programmable processors. In another implementation, the computing system of the backend 102 can optionally include two or more separate machines that communicate over a bus, a network connection, a direct local connection, or the like. Each of the two or more machines can optionally include one or more physical programmable processors.

The first module 104 or one or more routines, procedures, or other software functionality that provides one or more similar functionalities or features to those discussed herein as attributable to the first module 104 can handle features relating to a search engine initialization process. The second module 106 or one or more routines, procedures, or other software functionality that provides one or more similar functionalities or features to those discussed herein as attributable to the second module 106 can handle providing of synchronous (e.g. real time or approximately real time) query responses. During the search engine initialization process, a data set to be searched can be read in, and the necessary data structures to be used during query operations can be built. One potential benefit of an implementation using at least some features of the approaches described herein is the potential to achieve an optimum query performance at run time. Engines used in the second module 106 can be capable of supporting concurrent search requests. The second module 106 can work on the data structures prepared by the first module 104 during the search engine initialization process and can maximize the use of system resource to generate the query results with the highest possible performance.

The computing system of the backend 102 can access one or more data repositories 110 that store data to be searched. The one or more data repositories can be stored on computer readable storage media that are a part of the computing system of the backend 102, or alternatively or in addition, on one or more computer readable storage media that can be accessed by the computing system of the backend 102 over one or more data connections, which can include a data bus, a local network connection, a wide area connection, or some other connection accessible via a network 112. In some implementations, the computing system can also include one or more core software platform modules 114 providing one or more features of a business software system, such as for example an enterprise resource planning (ERP) application. The computing system can also aggregate or otherwise provide a gateway via which users can access functionality provided by one or more external service providers 116. Client machines 120 can access the computing system, either via a direct connection, a local terminal, or over a network 112 (e.g. a local area network, a wide area network, a wireless network, the Internet, or the like).

When reading records from a data set, for example a data set stored in the one or more data repositories 110, a set of fields to be searched can be extracted from each record data set. These extracted fields can form an input string set, with the characters in each extracted field forming a string in the input string set. As an example, if the set of fields to be searched includes nine fields, and the data set includes 100 million records, the input string set can include 900 million strings. When the strings from the extracted fields are placed in the input string set, the duplicates can be removed. As a result, the size of the input string set can be much smaller than 900 million. To save additional storage space, the strings in the input string set need not be represented as C++ strings (or strings of another database programming language, for example), but can instead be stored as raw strings.

The data set records can be kept in an input record array. Each entry in the array can represent a data set record and each entry can contain an additional two fields in addition to a pointer field for each of the fields extracted from the records of the data set: a source identifier and a record identifier, both of which can be integers. The pointers, which can include a constant number of bytes or characters, can each point to a corresponding raw string in the input string set. As a result, for an example in which nine fields are to be searched, the size of each entry in the input record array can be 80 bytes (9 pointers that each requires 8 bytes and 2 integers that each requires 4 bytes).

A field table can also be constructed for each of the fields to be searched. The field tables can be used during run time to speed up the search. The size of each field table can be as large as the size of the data set. Accordingly, in an in-memory database environment, efficiency of construction of these data structures can be beneficial in supporting the largest possible data set with a given memory limit. The field table for each field can contain all distinct strings associated with that field in the data set. Each entry in the field table can include a key (discussed in greater detail below) and a vector. Each element of the vector can point to one data set record in the input record array such that the key matches to the field associated with the record. The key can optionally include three fields: a pointer pointing to the string associated with the field (in other words, pointing to a string in the input string set), a length value representative of the length of the string, and an integer map (used to further speed up the search). As a result, in an implementation, each key can optionally include 16 bytes.

In some implementations, a pre-screening process can be performed on the data set prior to the initialization to identify and exclude records that are not to be included in the search results returned in response to received queries. For example, in a search of a data set of social security number records targeting records of people who are currently alive, a death master file listing social security numbers of people who are deceased can be accessed and used in conjunction with the extraction of the fields. In this example, all of the fields to be searched need to be extracted from a given data record for the search process only if the value of a data record in a key field (or other field) of the record is absent from the death master file. In other words, fields from records occurring in the death master file are excluded from the field tables. Additional data space can be saved by excluding fields from such records from even being included in the input string set.

One or more features consistent with implementations of the current subject matter can be understood in terms of an illustrative example of a data set containing a number, R, of records. Of the set of R records, a key field value (or other field value), which can be a social security number in the example of a data set of social security records, of a subset including a number $R_s$ of the R records (e.g. $R_s \leq R$) can appear in a master file of records (e.g. a social security death master file) to be excluded from search results. The records include a number F of distinct fields (excluding those fields other than SSN field from the social security death master file). The average field size can be a number, L, of characters. Any given field, i, can have a number, $F_i$, of distinct entries. In such an example, the amount of memory required to extract the fields to be included in a search can be estimated as follows. The size of the input string set in this example is $(L+1) \times F$ bytes, and the size of the input record array is $80 \times R$ bytes. The field table has $F_i$ keys, and these keys occupy $16 \times F_i$ bytes. The field table for social security number contains references to R input records (assuming that each record has a valid SSN field), and these references take $8 \times R$ bytes. Each of the other 8 field tables has $F_i$ keys. These keys take $16 \times F_i$ bytes. The field table contains references to $(R-R_s)$ input records (assume each record has a valid matching field). These references take $8 \times (R-R_s)$ bytes.

In an example of a data set that can be searched in an improved manner using an implementation of the current subject matter, the social security records listed and having the field values shown in Table 1 can be included in the data set. As shown, there are three fields, "first name", "last name", and "social security number". An example of a search request submitted for execution on the data set can include the searches listed in Table 2. Based on the data set shown in Table 1 and the set of searches in the search request shown in Table 2, the search request will generate the results shown in Table 3. A match is generated when any of the conditions in Table 2 are met.

TABLE 1

Records in an example data set.

| Record | First Name | Last Name | Social Security Number |
|---|---|---|---|
| R1 | Mike | Adams | 012345678 |
| R2 | Dave | Washington | 123456789 |
| R3 | Bin | Clinton | 234567890 |
| R4 | Richard | Eastwood | 345678901 |
| R5 | Dave | Lee | 456789012 |
| R6 | Rose | Park | 567890123 |
| R7 | Steve | Johnson | 678901234 |
| R8 |  | Berg | 789012345 |

TABLE 2

An example set of searches in a search request.

| Search | Sub-search on First Name | Sub-search on Last Name | Sub-search on SSN |
|---|---|---|---|
| S1 | Exact search for "Dave" |  | Exact search for "123456789" |
| S2 | Exact search for "Quinn" | Substring search for "oo" |  |
| S3 | Substring search for "ve" |  |  |
| S4 |  | Exact search for "Clinton" | Substring search for "56789" |

TABLE 3

An example of results generated.

| Search | Matching Records |
|---|---|
| S1 | R2, R5 |
| S2 | R4 |
| S3 | R2, R5, R7 |
| S4 | R2, R3, R4, R5, R6 |

This type of search can be very time consuming. Assuming the data set contains 100 million records and each record contains 5 fields, that a search request can contain 100,000 searches, that each search must access every field (that is, each search contains 5 sub-searches), and that each sub-search is a sub-string search, handling such a search request can potentially require approximately 50 trillion sub-string searches (100,000,000 records×5 fields×100,000 searches). It is clear that even with the fastest search algorithm, search performance can become a significant factor when dealing with a very large data set. Using the assumption that approximately 5 million substring operations can be performed by a single CPU in one second and that perfect parallelization and load balancing of such operations can be achieved, it would take 10,000 seconds (approximately 2.8 hours) for 1,000 CPUs to perform 50 trillion substring operations.

Accordingly, in addition to using one or more optimized substring algorithms, implementations of the current subject matter are also capable of taking advantage of parallelization schemes, load balancing, reducing search sizes, and reduction if not elimination of substring searches. For example, implementations of the current subject matter can include building efficient data structures to represent the data set to speed up both exact searches and substring searches, using the best possible substring search algorithm, reducing the search size, avoiding performing substring searches if possible, converting substring searches into exact searches if possible, efficiently using as many available system resources as possible, and load balancing the search to reduce if not minimize the waste of CPU power.

One possible feature of implementations of the current subject matter can include special data structures that can be prepared during search engine initialization. In a data set that rarely changes or that experiences significant changes on a time scale that is substantially longer than the time between successive searches, the data set can be loaded into memory only once in support of multiple searches. When the data set is loaded into memory (e.g. as part of an in-memory database system), a binary tree can be built for each field. With the example data set summarized above in regards to Table 1, three binary trees can be built, one for first name, one for last name, and one for social security number.

Each binary tree can be sorted, for example using one or more criteria. In an implementation, a first sorting criterion can be the reverse order of the length of the values in the field. For records with the same length, a second sorting criterion can be the reverse order of the string contents. Records with the same key can be grouped together, while records with NULL field (i.e. no value in the field) are not included in the binary tree. Referring again to the example data set in Table 1, the binary trees for first name, last name, and social security number using these binary tree sorting rules are summarized in Table 4, Table 5, and Table 6, respectively.

TABLE 4

Sorted binary tree for the first name field.

| Key | Records |
|---|---|
| Richard | R4 |
| Steve | R7 |
| Rose | R6 |
| Mike | R1 |
| Dave | R2, R5 |
| Bin | R3 |

TABLE 5

Sorted binary tree for the last name field.

| Key | Records |
|---|---|
| Washington | R2 |
| Eastwood | R4 |
| Johnson | R7 |
| Clinton | R3 |
| Adams | R1 |
| Park | R6 |
| Berg | R8 |
| Lee | R5 |

TABLE 6

Sorted binary tree for the social security number field.

| Key | Records |
|---|---|
| 789012345 | R8 |
| 678901234 | R7 |
| 567890123 | R6 |
| 456789012 | R5 |
| 345678901 | R4 |
| 234567890 | R3 |
| 123456789 | R2 |
| 012345678 | R1 |

In general, if the data set contains N records, a binary tree for a field will have N entries if all of the records include a value in that field and if none of the values are duplicative among more than one record. However, since a record with a NULL entry for the field need not be included in the binary tree, and since records with the same field can share the same entry in the binary tree, the binary tree for a field can be significantly smaller than N. For example, the first name binary tree shown in Table 4 contains 6 entries (instead of 8 as in the full data set). Record R8 does not have an entry in the binary tree since it has a NULL first name. Records R2 and R5 share the same entry since they have the same value in the first name field.

With such a data representation, an exact search on a field can be very fast. For example, if the size of the binary tree for a field is N, the worst case performance for performing an exact search on such a field is approximately given by Log (N). A data representation such as that discussed above can also facilitate significant increases in the speed of a substring search on a field as discussed in further detail below.

In some implementations, the substring search algorithm can be the Knuth-Morris-Pratt (KMP) algorithm. Other algorithms can be used in addition or in the alternative. To search a substring, the KMP algorithm first builds a table for the substring to be searched. If a search request contains S1 searches and each search contains S2 sub-searches on average, the total number of tables to be built is S1×S2 assuming that each sub-search is a substring search. However, since the number of searches in a search request is generally much smaller than the data set size, the time spent on building the tables necessary to complete the searches can generally be small relative to the overall complexity.

Referring again to the example data set of Table 1, to perform a substring search for "Dawn" on the first name field (as given in the first section), the binary tree for the first name field can be divided into three subsections such that the first subsection (S1) contains all entries in the first name binary tree whose keys (first name) are longer than 4 (the length of "Dawn"), the second subsection (S2) contains all entries that have keys of length 4 and contents greater than or equal to "Dawn", and the third subsection (S3) contains the rest of the entries. As used herein, the term "greater than" as applied to a comparison of the contents of a key of an entry in a binary tree and an input string refers to the contents of the key having a higher value (e.g. as 8 is greater than 7, M is greater than L, etc. according to an alphanumeric ordering beginning at 0, 1, 2, 3, . . . through . . . W, X, Y, Z) than the input string. These three subsections S1, S2, and S3 are illustrated in Table 7, Table 8, and Table 9, respectively.

TABLE 7

The first subsection (S1) of the binary tree of TABLE 4.

| Key | Records |
|---|---|
| Richard | R4 |
| Steve | R7 |

TABLE 8

The second subsection (S2) of the binary tree of Table 4.

| Key | Records |
|---|---|
| Rose | R6 |
| Mike | R1 |

TABLE 9

The third subsection (S3) of the binary tree of TABLE 4.

| Key | Records |
|---|---|
| Dave | R2, R5 |
| Bin | R3 |

Based on the way the binary tree is organized (e.g. using a first sorting criterion of the reverse order of the length of the values in the field and a second criterion of strings of the same length being sorted in reverse order by their contents), division of the entire binary tree into the three subsections can be performed very quickly. If the binary tree contains N entries, the complexity of finding the three subsections can be on the order of approximately Log(N). Two binary searches can be all that is required to perform the division of the binary table.

In returning search results, it is not necessary to perform any operation on subsection S3 since it only contains entries either with keys shorter than the target substring (i.e. "Dawn") or with keys less than the target substring. That is, there is no chance for the target substring to be a substring of any entry in the third subsection (S3). For any entry in the second subsection (S2), it is only necessary to perform an exact search. In this manner, a computationally expensive substring search can be converted into a much cheaper exact search, because any entry in the second subsection (S2) has a key length that is the same as the target substring (e.g. "Dawn"). As a result, the target substring is a substring of any entry in the second subsection (S2) if and only if it has an exact match with that entry. As a further improvement, because the second subsection (S2) is a section of a binary tree, one simple binary search is all that is needed to perform an exact search for the target substring on the second subsection (S2).

As a result of the approaches summarized above, a complete substring search need only be performed on the first subsection (S1) of the binary tree. In general, as the length of the input string to search increases, the size of the first subsection (S1) of the binary tree becomes smaller.

In some implementations, the number of substring searches can be further reduced if the input string of a substring search is examined to count a number of a specific type of character in the input string. For example, if an input string contains the character "A" three times, for an entry in the binary tree to contain a matching substring, the string associated with the entry must contain at least three instances of the character "A." As such, counting the occurrences of each character associated with each field associated with each of the records in the data set can allow rapid exclusion of potentially a large number of fields by checking the count of characters in the input string against the character tallies for each of the fields of each of the records. Only those strings that contain at least as many occurrences of a given character in the input string would need to be searched as all other strings cannot possibly contain the substring.

However, such a strategy can present at least two challenges. First, the amount of memory required to keep a character count for each field of each of a large number of data records in a data set can potentially be quite huge. Additionally, the count checking of the fields of the data records needs to be advantageously relatively computationally inexpensive compared to a conventional substring search for this count checking approach to provide an improvement in performance. One approach to lessening the required memory and the computational demands of a counting approach as discussed above can involve using a limited number of bytes to represent the character count of any given string in the fields of the data records.

In an illustrative implementation, four (4) bytes can be used to represent the count. The count for each entry in a binary tree can be attached to the entry in the binary tree. As initialization of the search engine can occur in a pre-runtime phase, the counting preparation work for entries in the binary trees can be done in that phase such that the runtime impact can be eliminated or at least reduced. By using a limited number of bytes (e.g. only four bytes) to keep the count, the amount of counting work can be limited, which can also be useful from a computational performance standpoint. In other implementations, it can be possible to capture more counting information by using more space for the count representation. As a result of such an approach, more substring searches can be avoided at run time. For example, instead of using 4 bytes, 8 bytes could be used for the count representation (unsigned long in C/C++).

In the example of a four byte count, for those fields that contain numbers (such as social security number field or zip code field), 3 bits can be used for each digit between 0 and 7, and 4 bits can be used for 8 and 9. For any other fields, 3 bits can be used for each character between A and I, 3 bits can be used for L, and 2 bits can be used for M. In an example implementation, all letters are converted to upper case. However, this need not be the case. If two bits are used, 00 indicates 0 count, 01 indicates 1 count, and 11 indicates 2 or more counts. If three bits are used, 000 indicates 0 count, 001 indicates 1 count, 011 indicates 2 counts, and 111 indicates 3 or more counts. If four bits are used, 0000 indicates 0 count, 0001 indicates 1 count, 0011 indicates 2 counts, 0111 indicates 3 count, and 1111 indicates 4 or more counts.

As an example, a social security string field in a record of the data set can contain the 9-digit number "980000225", which can have as its count representation the following:

| 9 | 8 | 7 | 6 | 5 | 4 | 3 | 2 | 1 | 0 |
|---|---|---|---|---|---|---|---|---|---|
| 0001 | 0001 | 000 | 000 | 001 | 000 | 000 | 011 | 000 | 111 |

With such a representation, a simple bit-wise operation is all that is needed to check if enough characters are in the string. For example, an input string X can have a count representation of $IM_x$. For a string Y with a count representation $IM_y$, string Y can potentially contain a substring X if and only if the following is true (in C/C++ semantics):

$$(IM_x \& IM_y) = IM_x$$

In more concrete terms, an example of a partial SSN string can be "00022". The count representation of this partial string is:

| 9 | 8 | 7 | 6 | 5 | 4 | 3 | 2 | 1 | 0 |
|---|---|---|---|---|---|---|---|---|---|
| 0000 | 0000 | 000 | 000 | 000 | 000 | 000 | 011 | 000 | 111 |

To check if this partial string is a substring of 980000225, the above operation can be performed as follows:

| 0001 | 0001 | 000 | 000 | 001 | 000 | 000 | 011 | 000 | 111 & |
|---|---|---|---|---|---|---|---|---|---|
| 0000 | 0000 | 000 | 000 | 000 | 000 | 000 | 011 | 000 | 111 = |
| 0000 | 0000 | 000 | 000 | 000 | 000 | 000 | 011 | 000 | 111. |

The result indicates that SSN string 980000225 can potentially contain the substring 00022. It should be mentioned here that the string 980000225 is only a potential candidate at this point. For example, the partial SSN string 0000022 will also pass the above test, but string 980000225 does not contain substring 0000022.

As another example, a partial SSN string 9900022 can have as a count representation:

| 9 | 8 | 7 | 6 | 5 | 4 | 3 | 2 | 1 | 0 |
|---|---|---|---|---|---|---|---|---|---|
| 0011 | 0000 | 000 | 000 | 000 | 000 | 000 | 011 | 000 | 111 |

Performing the above operation, yields the following result:

| | | | | | | | | | |
|---|---|---|---|---|---|---|---|---|---|
| 0001 | 0001 | 000 | 000 | 001 | 000 | 000 | 011 | 000 | 111 & |
| 0011 | 0000 | 000 | 000 | 000 | 000 | 000 | 011 | 000 | 111 ≠ |
| 0001 | 0000 | 000 | 000 | 000 | 000 | 000 | 011 | 000 | 111. |

It can therefore be concluded that there is no chance for SSN string 980000225 to contain the substring 9900022.

Figure 2:
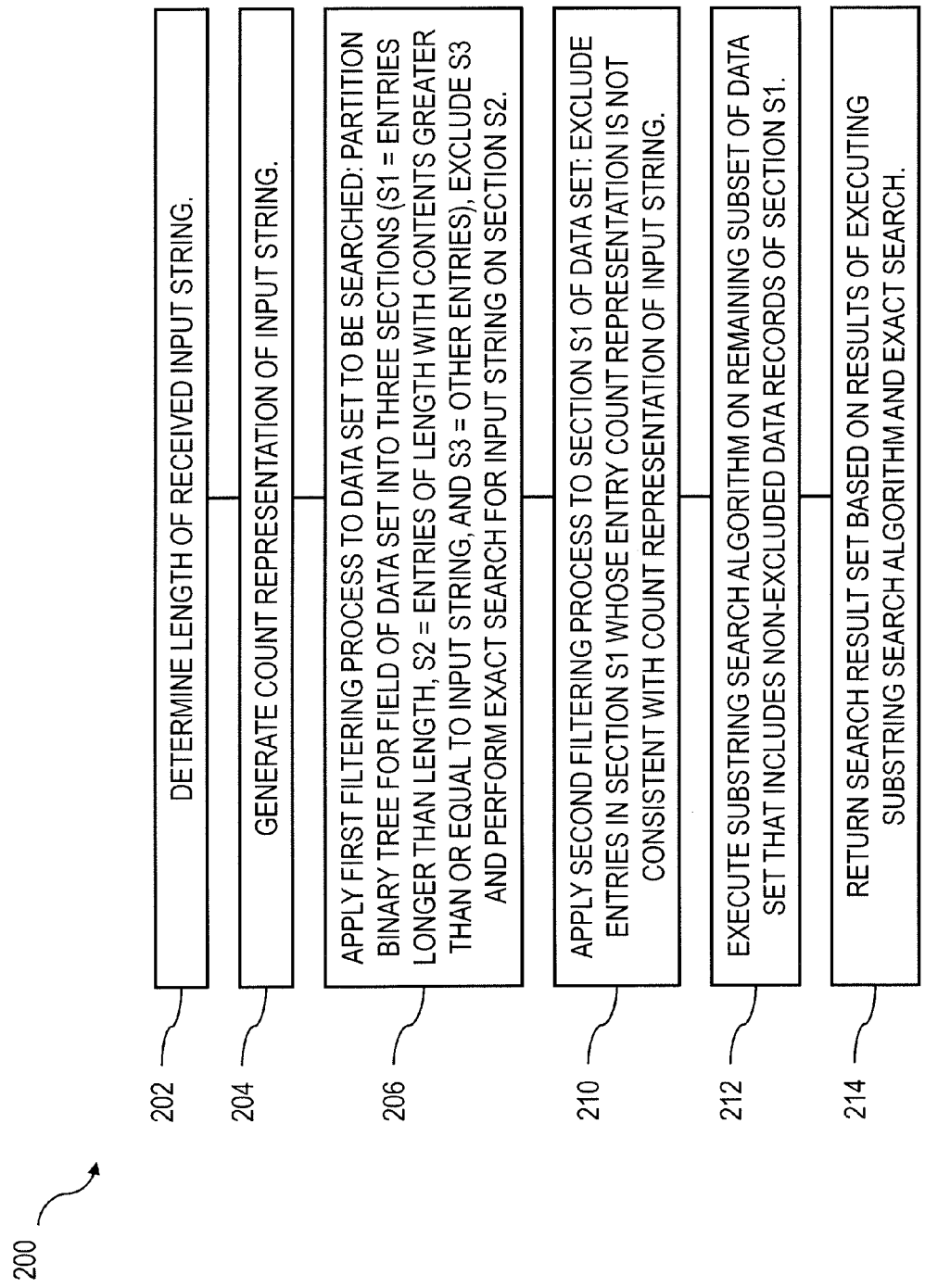
FIG. 2 is a diagram illustrating aspects of a system showing features consistent with implementations of the current subject matter.

FIG. 2 shows a process flow chart 200 illustrating method features, one or more of which can be present in an implementation of the current subject matter. At 202, a length of a received input string is determined, and at 204, a count representation of the input string is generated. Data structures needed by the search algorithm for the input string can be built. In an example in which the search algorithm is the KMP algorithm, this operation or operations can include building the KMP table for the input string. At 206, a first filtering process can be applied to the data set. The first filtering process can include partitioning binary trees for the data set into three sections, S1, S2, and S3, as discussed above, excluding section S3, and using an exact search to search section S2. At 210, a second filtering process can be applied to section S1. The second filtering process can include excluding each entry in section S1 of the data set whose entry count representation is not consistent with the count representation of the input string. At 212, a substring search algorithm is executed on a remaining subset of the data set that includes non-excluded data records of section S1. A search result set can be returned at 214 based on the results of executing the substring search algorithm and the exact search on section S2.

Some implementations of the current subject matter can use as much processing power (i.e. number of central processing units or CPUs) as possible, and can load balance searches in such a way as to minimize or at least reduce the waste of CPU power. This approach can result from processing as many searches in parallel as possible (up to the system's CPU limit). If more CPUs are available than the number of searches, the extra CPUs can be used to further parallelize the sub-searches. In addition, statistics gathered during the initialization phase can be used to distribute work load to minimize the waste of CPU power.

For example, a request can contain R searches while the system has C CPUs available. Implementations of the current subject matter can initially instantiate min(C, R) processing threads for the request. Furthermore, if the request can use $C_t$ CPUs at a given time, min($C_t$, R) processing threads can be active at that time for the request and each active processing thread can be allowed to use a number of CPUs consistent with $$\max\left(1, \frac{Ct}{\min(Ct, R)}\right)$$

For example, if a system has 160 CPUs and the request contains 1,000 searches, a search approach consistent with an implementation of the current subject matter can create 160 processing threads for the request. If at a given time the system allows the request to use 20 CPUs, 20 processing threads can be active. Each of the active processing threads can be allowed to use one CPU. As another example, if the system has 160 CPUs, and the request contains 4 searches, a search approach consistent with an implementation of the current subject matter can create 4 processing threads for the request. If at a given time the system allows the request to use 40 CPUs, 4 processing threads can be active. Each of the active processing threads can be allowed to use 10 CPUs.

For each request, a search approach consistent with an implementation of the current subject matter can place all the searches associated with the request into an input record queue. Each processing thread for the request can monitor the input record queue, for example, periodically, continuously, semi-continuously, or the like. If the number of CPUs allowed for the request exceeds the number of active processing threads for the request, the processing thread can wait and become inactive. When it is possible to proceed, the processing thread can become active and can then determine the number of CPUs it can use, remove one input record from the input record queue, and start to work on that input record (i.e., a search). This process can be repeated until the input record queue is empty.

When a processing thread starts to work on an input record (a search), it can first decompose the search into a series of sub-requests based on the sub-search requirement defined by the search.

An exact search of the records in section S2 can be very straightforward since each field has a binary tree built during initialization. Accordingly, sub-requests that only require an exact search can be handled by the processing thread itself.

For each sub-request that requires a substring search, the section of the corresponding binary tree (S1) that needs to be searched can be determined. The size of the section, together with the average length of the field (which is calculated during initialization), can determine the amount of workload needed to be handled for that sub-request. If an active processing thread is allowed to use C CPUs, C sub-threads can be created to handle the sub-requests that require substring search. The total amount of substring search work can be evenly distributed to those C sub-threads. After those C sub-threads are instantiated, the processing thread can process the sub-requests that require an exact search and can then wait for the completion of the sub-threads. When all sub-threads are completed, the processing thread can return to check the input record queue again.

In an illustrative example, an active processing thread can use 4 CPUs, and the search to be performed is a substring search on SSN, business name, and alternate business name. The S1 section of the SSN field to search contains 1,000,000 entries, the S1 section of the business name field to search contains 1,000,000 entries, and the S1 section of the alternate business name field to search contains 500,000 entries. During the initialization process in this example, the following can be determined: the average size of SSN field is 9, the average size of business name field is 18, and the average size of alternate business name field is 18. Based on these parameters, 4 sub-threads can be created to handle the work load. A first sub-thread can handle the sub-search for SSN, a second and third sub-threads can handle the sub-search for business name, and the fourth sub-thread can handle the sub-search for alternate business name. The second sub-thread can search the first half of the section (500,000 entries) while the third sub-thread can search the second half of the section (500,000 entries). In this example and consistent with implementations of the current subject matter, the four (or whatever number of) sub-threads are configured to finish at almost the same time to minimize waste of available CPU power.

One or more other features can optionally be included to balance the use of different resources. For example, each processing thread can write results as soon as possible (rather than waiting to the very end). As an illustrative example, once a processing thread accumulates more than 4000 result records, it can temporarily suspend processing operations and write the result. The results generated by a processing thread can optionally be placed in a waiting queue. Each processing thread can hold the results until either the number of result records it is holding exceeds a threshold amount (e.g. 4000) or the processing comes to the end. At that time, the processing thread can write the result to the destination. By having each processing thread hold no more than a threshold amount (e.g. 4000) results, the possibility that the too many results will be retained such that the system runs out of memory can be reduced if not eliminated. This approach can assist in improving system reliability.

In an implementation, potential losses of processing resources can occur due to reasons such as resource contention (for example, two threads attempt to write the results at the same time). To compensate the loss of processing resources, an excess of 10% more processing threads can be created over the hardware resource limit.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in one or more of a high-level procedural language, a scripting language, a functional language, an object-oriented programming language, or the like, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

determining a length of a received input string;

generating a count representation of the received input string;

applying a first filtering process to a data set to be searched, the first filtering process comprising partitioning a binary tree for a field of the data set into a section S1, a section S2, and a section S3, the section S1 comprising entries in the binary tree that have keys longer than the length of the received input string, the section S2 comprising entries in the binary tree that have keys equal to the length of the received input string and contents that are greater than or equal to the received input string, and the section S3 comprising other entries in the binary tree, the other entries comprising those entries in the binary tree that are not in section S1 or in section S2, the first filtering process further comprising excluding the section S3 and performing an exact search for input string on the section S2;

applying a second filtering process to the section S1 of the data set, the second filtering process comprising excluding entries in the section S1, the excluded entries in the section S1 having an entry count representation that is not consistent with the count representation of the input string;

executing a substring search algorithm on a remaining subset of the data set, the remaining subset comprising non-excluded data records of the section S1; and returning a search result set based on results of executing the substring search algorithm on the remaining subset of the section S1 and the exact search on the section S2.

2. The computer program product as in claim 1, wherein the operations are performed in an in-memory database environment.

3. The computer program product as in claim 1, wherein the operations further comprise building the binary tree and sorting the binary tree.

4. The computer program product as in claim 3, wherein the sorting of the binary tree comprises sorting using a first sorting criterion comprising a reverse order of lengths of values in the field, and using a second sorting criterion comprising a reverse order of contents of the keys of the entries in the binary tree.

5. The computer program product as in claim 1, wherein the generating of the count representation of the input string comprises an indication of a number of instances of a given character or group of characters are present in the input string.

6. The computer program product as in claim 1, wherein the operations further comprise generating the entry count representation for the entries in the binary tree.

7. A system comprising:
a computer hardware comprising at least one programmable processor; and
a machine-readable medium storing instructions that, when executed by the at least one programmable processor, cause the at least one programmable processor to perform operations comprising:
determining a length of a received input string;
generating a count representation of the received input string;
applying a first filtering process to a data set to be searched, the first filtering process comprising partitioning a binary tree for a field of the data set into a section S1, a section S2, and a section S3, the section S1 comprising entries in the binary tree that have keys longer than the length of the received input string, the section S2 comprising entries in the binary tree that have keys equal to the length of the received input string and contents that are greater than or equal to the received input string, and the section S3 comprising other entries in the binary tree, the other entries comprising those entries in the binary tree that are not in section S1 or in section S2, the first filtering process further comprising excluding the section S3 and performing an exact search for input string on the section S2;
applying a second filtering process to the section S1 of the data set, the second filtering process comprising excluding entries in the section S1, the excluded entries in the section S1 having an entry count representation that is not consistent with the count representation of the input string;
executing a substring search algorithm on a remaining subset of the data set, the remaining subset comprising non-excluded data records of the section S1; and
returning a search result set based on results of executing the substring search algorithm on the remaining subset of the section S1 and the exact search on the section S2.

8. The system as in claim 7, wherein the operations are performed in an in-memory database environment.

9. The system as in claim 7, wherein the operations further comprise building the binary tree and sorting the binary tree.

10. The system as in claim 9, wherein the sorting of the binary tree comprises sorting using a first sorting criterion comprising a reverse order of lengths of values in the field, and using a second sorting criterion comprising a reverse order of contents of the keys of the entries in the binary tree.

11. The system as in claim 7, wherein the generating of the count representation of the input string comprises an indication of a number of instances of a given character or group of characters are present in the input string.

12. The system as in claim 7, wherein the operations further comprise generating the entry count representation for the entries in the binary tree.

13. The computer-implemented method comprising:
determining a length of a received input string;
generating a count representation of the received input string;
applying a first filtering process to a data set to be searched, the first filtering process comprising partitioning a binary tree for a field of the data set into a section S1, a section S2, and a section S3, the section S1 comprising entries in the binary tree that have keys longer than the length of the received input string, the section S2 comprising entries in the binary tree that have keys equal to the length of the received input string and contents that are greater than or equal to the received input string, and the section S3 comprising other entries in the binary tree, the other entries comprising those entries in the binary tree that are not in section S1 or in section S2, the first filtering process further comprising excluding the section S3 and performing an exact search for input string on the section S2;
applying a second filtering process to the section S1 of the data set, the second filtering process comprising excluding entries in the section S1, the excluded entries in the section S1 having an entry count representation that is not consistent with the count representation of the input string;
executing a substring search algorithm on a remaining subset of the data set, the remaining subset comprising non-excluded data records of the section S1; and
returning a search result set based on results of executing the substring search algorithm on the remaining subset of the section S1 and the exact search on the section S2.

14. The computer-implemented method as in claim 13, wherein the operations are performed in an in-memory database environment.

15. The computer-implemented method as in claim 13, wherein the operations further comprise building the binary tree and sorting the binary tree.

16. The computer-implemented method as in claim 15, wherein the sorting of the binary tree comprises sorting using a first sorting criterion comprising a reverse order of lengths of values in the field, and using a second sorting criterion comprising a reverse order of contents of the keys of the entries in the binary tree.

17. The computer-implemented method as in claim 13, wherein the generating of the count representation of the input string comprises an indication of a number of instances of a given character or group of characters are present in the input string.

18. The computer-implemented method as in claim 13, wherein the operations further comprise generating the entry count representation for the entries in the binary tree.

19. The computer-implemented method as in claim 13, wherein at least one of the determining, the generating, the applying of the first filtering, the applying of the second filtering, the executing, and the returning is performed by at least one programmable processor.

* * * * *